US012624637B2

(12) United States Patent
Banhos et al.

(10) Patent No.: US 12,624,637 B2
(45) Date of Patent: May 12, 2026

(54) CMC AIRFOIL WITH CIRCUMVENTING COOLING PASSAGE

(71) Applicant: RTX CORPORATION, Farmington, CT (US)

(72) Inventors: Jonas Banhos, West Hartford, CT (US); James T. Roach, Vernon, CT (US); Russell Kim, Temecula, CA (US); Raymond Surace, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/480,692

(22) Filed: Oct. 4, 2023

(65) Prior Publication Data

US 2025/0116197 A1 Apr. 10, 2025

(51) Int. Cl.
*F01D 5/18* (2006.01)
*F01D 5/28* (2006.01)

(52) U.S. Cl.
CPC ............. *F01D 5/186* (2013.01); *F01D 5/282* (2013.01); *F05D 2230/20* (2013.01); *F05D 2230/60* (2013.01); *F05D 2240/304* (2013.01); *F05D 2240/306* (2013.01); *F05D 2300/6033* (2013.01)

(58) Field of Classification Search
CPC ................................. F01D 5/186; F01D 5/282
See application file for complete search history.

(56) References Cited

U.S. PATENT DOCUMENTS

| | | | | |
|---|---|---|---|---|
| 9,435,208 | B2 * | 9/2016 | Bunker .................. | F01D 5/186 |
| 9,683,443 | B2 | 6/2017 | Freeman et al. | |
| 10,415,397 | B2 | 9/2019 | Gallier | |
| 10,605,095 | B2 | 3/2020 | Gallier et al. | |
| 10,767,494 | B2 | 9/2020 | Hillier | |
| 11,598,216 | B2 | 3/2023 | Gallier et al. | |
| 2014/0271153 | A1 | 9/2014 | Uskert et al. | |
| 2017/0328216 | A1 | 11/2017 | Gallier | |
| 2019/0210929 | A1 | 7/2019 | Propheter-Hinckley | |
| 2019/0330988 | A1 | 10/2019 | Hillier | |

OTHER PUBLICATIONS

European Search Report for European Patent Application No. 24204367.7 mailed Jan. 9, 2025.

* cited by examiner

*Primary Examiner* — Michael L Sehn

(74) *Attorney, Agent, or Firm* — Carlson, Gaskey & Olds, P.C.

(57) ABSTRACT

An airfoil includes an airfoil section that defines a trailing edge region that includes a trailing edge. The airfoil section is formed of a ceramic matrix composite that includes core fiber plies and skin fiber plies. The core fiber plies define a radial tube that has a radiused end in the trailing edge region. The skin fiber plies wrap around the core fiber plies and a filler element in the trailing edge region is aft of the internal cavity and is sandwiched between the skin fiber plies on the pressure side and the skin fiber plies on the suction side. There is at least one cooling passage that includes a first, inlet orifice section that opens to the internal cavity at a location forward of the radiused end and that extends through the core fiber plies, and a second, outlet orifice section that extends through the trailing edge.

15 Claims, 4 Drawing Sheets

CMC AIRFOIL WITH CIRCUMVENTING COOLING PASSAGE

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature core gas flow. The high-pressure and temperature core gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil according to an example of the present disclosure includes an airfoil section that defines pressure and suction sides, a leading edge, and a trailing edge region including a trailing edge. The airfoil section is formed of a ceramic matrix composite that includes fiber plies disposed in a ceramic matrix. The fiber plies have core fiber plies that define a radial tube that circumscribes an internal cavity. The radial tube has a radiused end in the trailing edge region, and skin fiber plies define an exterior of the airfoil section and wrap around the core fiber plies from the pressure side of the trailing edge region, through the leading edge, and to the suction side of the trailing edge region. There is a filler element in the trailing edge region aft of the internal cavity and sandwiched between the skin fiber plies on the pressure side and the skin fiber plies on the suction side. At least one cooling passage has a first, inlet orifice section that opens to the internal cavity at a location forward of the radiused end and extends through the core fiber plies, and a second, outlet orifice section that extends through the trailing edge.

In a further embodiment of any of the foregoing embodiments, the at least one cooling passage includes a third, intermediate section connecting the first and second sections, and the third section is bound by at least one of the skin plies and the filler element.

In a further embodiment of any of the foregoing embodiments, the filler element includes a filler core and a filler skin ply on the filler core, and the filler skin ply partially bounds the third section.

In a further embodiment of any of the foregoing embodiments, the third section is bound by at least two of the skin plies.

In a further embodiment of any of the foregoing embodiments, the fiber plies include a number N of the core fiber plies each having a ply thickness t, and the location is forward of the radiused end by a distance D that is greater than the product of N, t, and a multiplier X that is from five to ten.

In a further embodiment of any of the foregoing embodiments, the location is toward the suction side of the core fiber plies.

In a further embodiment of any of the foregoing embodiments, the at least one cooling passage includes multiple cooling passages, for a first portion of the multiple cooling passages the location is toward the suction side of the core fiber plies, and for a second portion of the multiple cooling passages the location is toward the pressure side of the core fiber plies.

In a further embodiment of any of the foregoing embodiments, the multiple cooling passages each include a third, intermediate section connecting the first and second sections. The third section of the first portion of the multiple cooling passages extend adjacent the suction side between at least one of the skin plies and the filler element, and the third section of the second portion of the multiple cooling passages extending adjacent the pressure side between at least one of the skin plies and the filler element.

A gas turbine engine according to an example of the present disclosure includes a compressor section, a combustor in fluid communication with the compressor section, and a turbine section in fluid communication with the combustor. The turbine section has airfoils according to any of the foregoing embodiments.

Also disclosed is a method of fabricating an airfoil according to any of the foregoing embodiments.

In a further embodiment of any of the foregoing embodiments, prior to densifying, the core fiber plies and the skin fiber plies contain no ceramic matrix.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
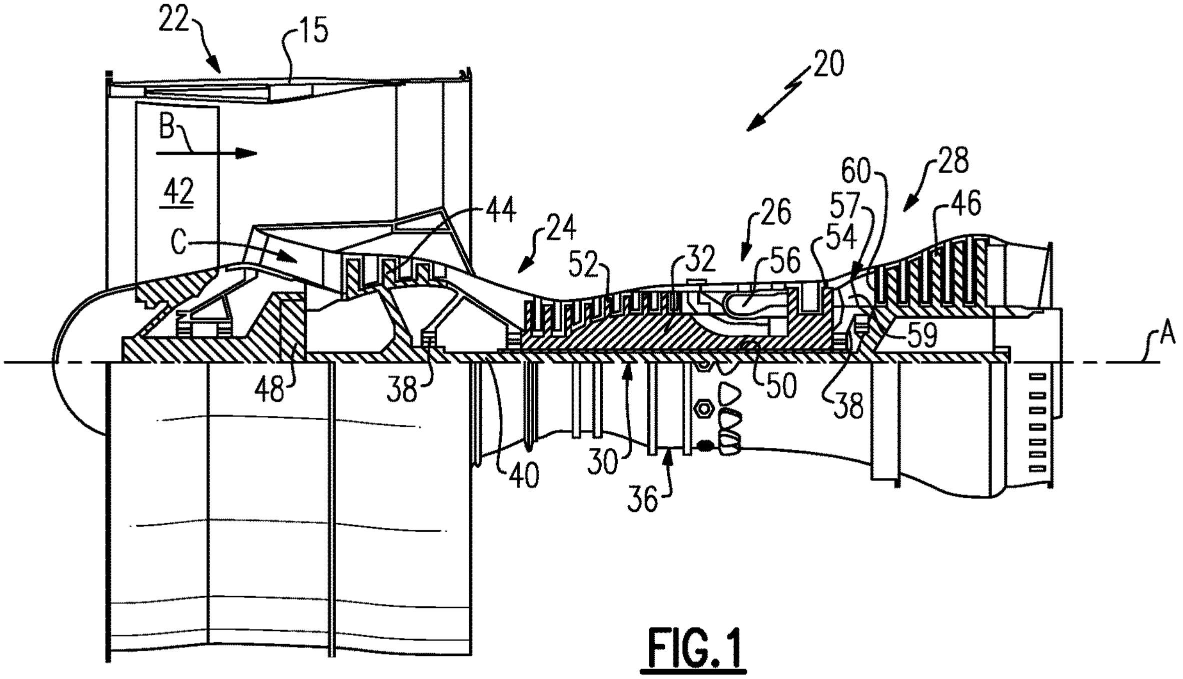
FIG. 1 illustrates a gas turbine engine.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram °R})/(518.7\text{ °R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
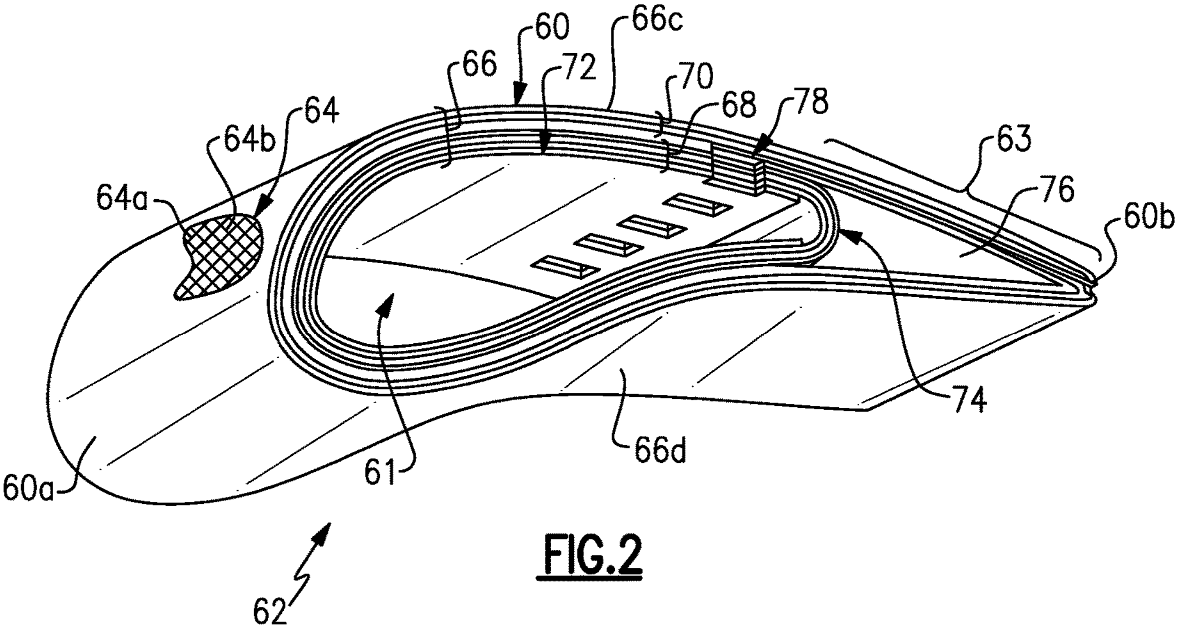
FIG. 2 illustrates a sectioned view of an airfoil section of the engine.
Figure 3:
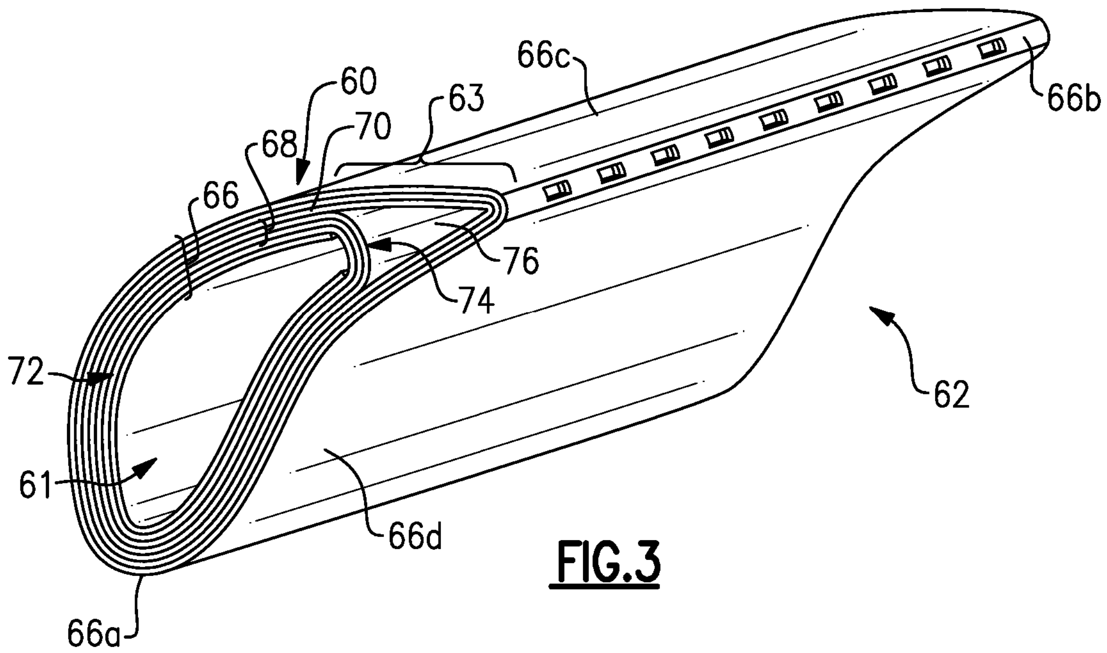
FIG. 3 illustrates another view of the airfoil section.

FIG. 2 illustrates a sectioned view of an airfoil section 60 through a mid-span region of an airfoil 62, and FIG. 3 illustrates the airfoil 62 from a direction aft-looking-forward. For example, the airfoil 62 is a turbine vane from the turbine section 28 of the engine 20, and there are a plurality of turbine vanes arranged in a circumferential row in the turbine section 28. Although not shown, the airfoil 62 can additionally include one or more platforms attached with the airfoil section 60. The airfoil section 60 is hollow and defines an internal cavity 61, a leading edge **60*a*, a trailing edge region 63 having a trailing edge 66*b*, a suction side 66*c*, and a pressure side 66*d*. The trailing edge region 63 generally refers to the aft portion of the airfoil section 60 and includes the aft portion of the internal cavity 61 and the trailing edge 66*b*, which is the rear-most edge of the airfoil section 60**. Terms such as "first" and "second" are used herein to differentiate that there are two architecturally distinct components or features. It is to be further understood that the terms "first" and "second" are interchangeable in that a first component or feature could alternatively be termed as the second component or feature, and vice versa.

The airfoil section 60 is formed of a ceramic matrix composite (CMC) 64. Referring to the cutaway section in FIG. 2, the CMC 64 includes ceramic fibers **64*a* that are disposed in a ceramic matrix 64*b*. The CMC 64 may be, but is not limited to, a SiC/SiC composite in which SiC fibers are disposed within a SiC matrix. The ceramic fibers 64*a* are provided in fiber plies 66** that may be woven or braided and may collectively include plies of different fiber weave configurations.

The fiber plies 66 include core fiber plies 68 and skin fiber plies 70. The core fiber plies 68 define a radial tube 72 that circumscribes and immediately borders the internal cavity 61. The skin fiber plies 70 define the exterior profile of the airfoil section 60 and wrap around the core fiber plies 68 from the pressure side 66*d* in the trailing edge region 63, through the leading edge 60*a*, and to the suction side 66*c* in the trailing edge region 63. In the illustrated example, there are four core fiber plies 68 and three skin fiber plies 70, although it is to be understood that the numbers of plies 68/70 can be varied.

The radial tube 72 has a radiused end 74 in the trailing edge region 63. Except for the inner-most one of the core fiber plies 68, all of the core fiber plies 68 wrap completely around the internal cavity 61. The inner-most one of the core fiber plies 68 terminates short of the radiused end 74, as the small radius may exceeds the capability of the ply to bend without fiber tow distress.

There is a filler element 76 in the trailing edge region 63 aft of the internal cavity 61. A filler element in general is often colloquially referred to as a "noodle" and serves as a non-structural space-filler, usually in an interstice where other fiber plies bend. Here, the filler element 76 fills in the region aft of the radiused end 74, sandwiched between the skin fiber plies 70 on the pressure side 66*d* and the skin fiber plies 70 on the suction side 66*c*. The filler element 76 may be formed of, but is not limited to, a bundle of densified ceramic fibers (a CMC) or a monolithic ceramic.

Figure 4:
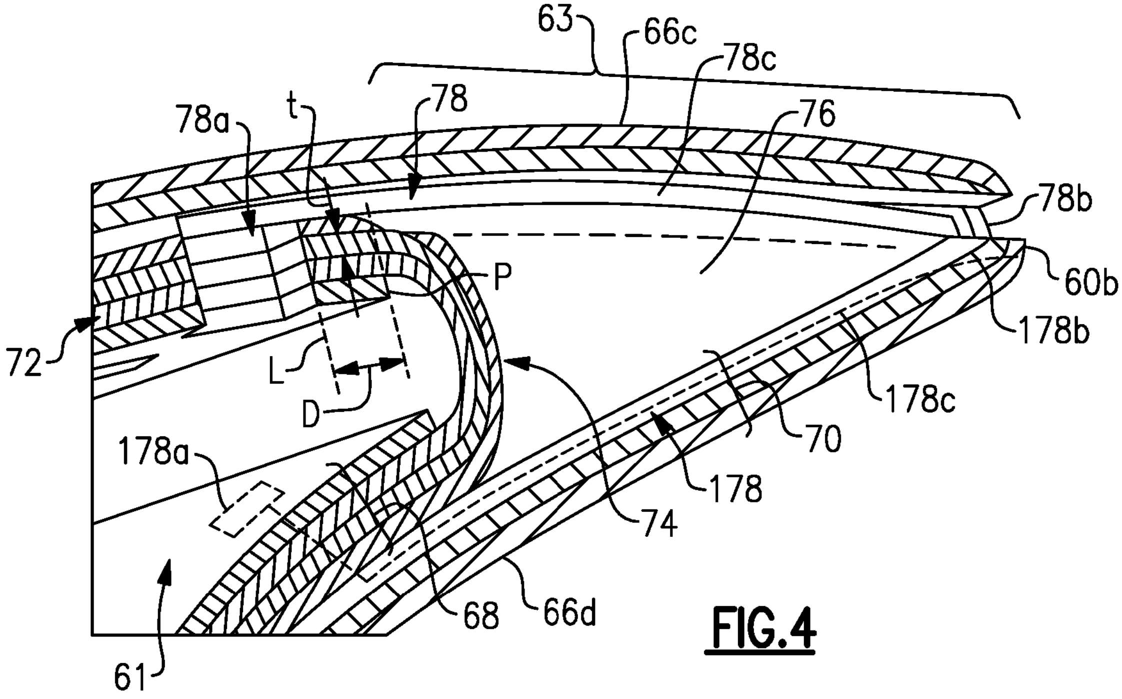
FIG. 4 illustrates a view of a cooling passage in the airfoil section.

The sides 66*c*/66*d* and the trailing edge region 63 may require cooling. In that regard, the airfoil section 60 includes at least one cooling passage 78, but most typically a plurality of cooling passages 78, for a flow of cooling air. For example, the cooling air is bleed air from the compressor section 24 that is provided into the internal cavity 61 and flows from the internal cavity 61 into the cooling passage(s) 78. A sectioned view through one of the cooling passages 78 is shown in an enlarged view in FIG. 4 and at least includes a first, inlet orifice section 78*a* and a second, outlet orifice section 78*b*. The first section 78*a* opens to the internal cavity 61 and serves for entry of the cooling air into the passage 78, and the second section extends through the trailing edge 60*b*, such as along a centerline of the trailing edge 60*b*, and serves to discharge spent cooling air to the exterior of the airfoil section 60 (into the core gaspath C).

The radiused end 74 of the radial tube 72 is an area that may be under considerable stress in the airfoil section 60. For example, the core fiber plies 68 are under bending stresses from bending at the radius in the end 74, and dynamic stresses on the airfoil section 60 may concentrate at this area due to the bending. Such stresses on a CMC may tend to cause delamination between fiber plies. In this regard, the proposition of using an orifice in the radiused end is undesirable, as it would cause a discontinuity in the ceramic fibers and thereby potentially weaken the CMC in that area. Rather, the first section 78*a* of the passage 78 is at a location L that is axially forward of the radiused end 74, so as to circumvent the end 74 and thus avoid inclusion of a discontinuity in the end 74. For example, the radiused end 74 is demarked by a location P, at which the core fiber plies 68 begin to bend, and the location L is forward of location P. In one example, in order to provide a margin from the location P, the location L is positioned based on a number N of the core fiber plies 68 and a ply thickness t of the plies 68. For instance, the location L is forward of location P by a distance D (to the closest edge of the first section 78*a*) that is greater than the product of N and t. In a further example, in order to ensure an adequate margin from the location P, the distance is a multiple of N, t, and a multiplier X, where X is from five to ten.

The first section 78*a* extends through the core fiber plies 68. For example, the central axis of the first section 78*a* is locally substantially perpendicular to the core fiber plies 68 and the skin fiber plies 70, but could alternatively be at a non-perpendicular angle. The cooling passage 78 further includes a third, intermediate section 78*c* that opens on its forward end to the first section 78*a* and opens on its aft end to the second section 78*b*. The third section 78*c* is substantially straight and of uniform cross-section along its full length, though it could alternatively include turns and/or taper in cross-section upstream-to-downstream or diverge in cross-section upstream-to-downstream, and connects the first and second sections 78*a*/78*b*. In this example, each passage 78 has a single inlet (78*a*) and a single outlet (78*b*). The third section 78*c* is bound on its interior side by the filler element 76, on its outer side by one of the skin plies 70 (i.e., an intermediate ply between the inner-most and outer-most skin plies), and on its lateral sides by the inner-most one the skin plies 70.

Figure 5:
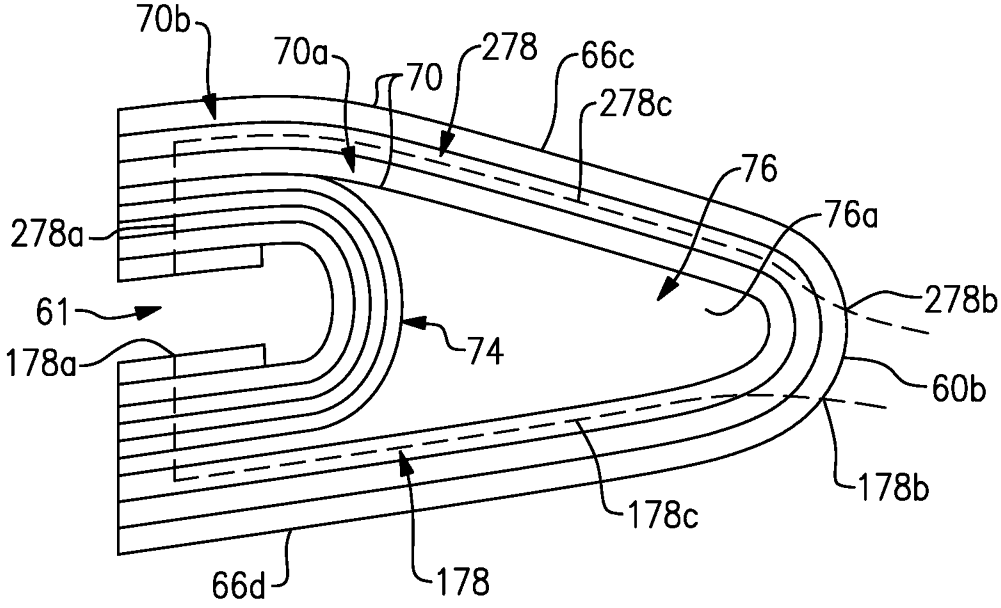
FIG. 5 illustrates a view of another cooling passage in the airfoil section

Alternatively, as shown in FIG. 5, the filler element 76 includes a filler core 76*a* and skin plies 70 on the filler core 76*a*, and the third section 278*c* of the passage 278 extends through the skin plies 70 such that the skin ply 70*a* laterally bounds the third section 278*c* and an outer skin ply 70*b* bounds the outer side of the third section 278*c*. The third section 278*c* opens on its forward end to the first section 278*a* (inlet) and opens on its aft end to the second section 278*b* (outlet). Having the third section 278*c* extend through the skin plies 70 rather than in the filler element 76 may provide a more consistent boundary, whereas filler elements may have difficulty conforming to fill voids especially where the adjacent core and skin plies bi-furcate.

In further embodiments, the location L is substantially further forward of location P by a multiple of distance D. In such examples, the third section 78*c* is longer and thus runs over a longer distance along the suction side 66*c* (or pressure side 66*d*), thereby providing additional cooling of the side 66*c* (or 66*d*).

Figure 6:
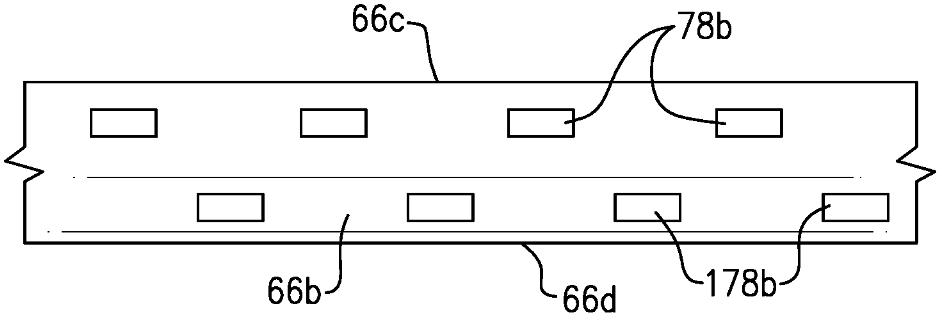
FIG. 6 illustrates a view of the trailing edge of the airfoil section.

In the prior examples, the first section 78*a* (and thus the location L) is toward the suction side 66*c* of the core fiber plies 68 such that the third section 78*c* of the passage 78 runs along the suction side 66*c*. However, in additional examples, as depicted in dashed lines in FIG. 4, a first section 178*a* (and thus the location L) of a passage 178 is toward the pressure side 66*d* of the core fiber plies 68 such that the third section 178*c* runs along the pressure side 66*d* to the second section 178*b*. In a further example, the airfoil section 60 includes passages 78 toward the suction side 66*c* and passages 178 toward the pressure side 66*d*. In that case, the passages 78/178 are radially staggered, as represented by the staggered spacing of the second sections 78*b*/178*b* in the illustration of the trailing edge 66*b* in FIG. 6.

Figure 7:
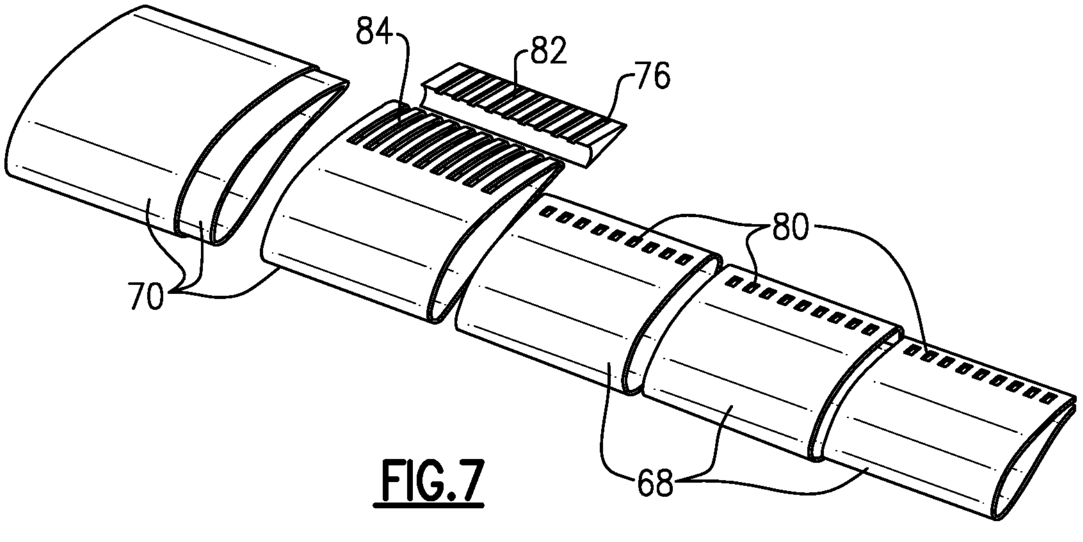
FIG. 7 depicts a method for fabricating an airfoil section.

FIG. 7 depicts a method for fabricating the airfoil section 60. Although not limited, the depicted example is based upon a ply lay-up process on which the various fiber plies 68/70 and filler element 76 are laid-up to form a preform. For example, the fiber plies 68/70 initially contain no matrix. The core fiber plies 68 are provided with cutouts 80, which may be formed by laser cutting or other suitable technique that does not substantially damage the fibers or result in undesirably uneven cut lines. The core fiber plies 68 are laid-up on a mandrel or other support surface such that the cutouts 80 align to form the first section 78*a* of the passage 78 of the airfoil section 60. The filler element 76 is then positioned adjacent the core fiber plies 68. For instance, the filler element 76 may be a prefabricated monolithic or CMC piece that has slots 82 provided thereon to form the third section 78*c*/178*c* of the passages 78/178. The first of the skin fiber plies 70 is then wrapped around the core fiber plies 68 and the filler element 76. The first skin ply 70 includes through slots 84 that align with the cutouts 80 and the slots 82 to form the lateral bounds of the third section of the passages 78/178. Finally, the remaining skin fiber plies 70 are wrapped around the first skin fiber ply 70, core fiber plies 68, and filler element 76 to form the preform. The preform is then densified with the ceramic matrix to form the CMC. For example, the ceramic matrix is formed by, but not limited to, chemical vapor infiltration (CVI), melt infiltration (MI), a hybrid of CVI and MI, and/or polymer infiltration and pyrolysis (PIP).

The disclosed methodology enables the passages 78/178 to be formed prior to densification. This not only eliminates a need for machining the passages into the final CMC but also enables enhanced densification of the CMC. For instance, densification depends to some extent on the ability of the matrix material or matrix precursor material (i.e., infiltrants) to flow into all depths of the preform during the densification process so that the preform becomes fully densified. In some cases, however, the thickness of the preform can exceed a depth at which the infiltrants can readily flow under practical processing conditions and times and achieve the desired density. As a result, the preform may be only partially densified in some regions, with pores or voids in the regions that the infiltrant cannot reach. The cutouts 80, slots 82, and though-slots 84 provide additional flow paths for the matrix material or matrix precursor material during densification and thereby can enhance densification in regions that may otherwise not be fully densified.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:

an airfoil section defining pressure and suction sides, a leading edge, and a trailing edge region including a trailing edge, the airfoil section being formed of a ceramic matrix composite that includes fiber plies disposed in a ceramic matrix, the fiber plies including:

core fiber plies defining a radial tube that circumscribes an internal cavity, the radial tube having a radiused end in the trailing edge region, and skin fiber plies defining an exterior of the airfoil section and wrapping around the core fiber plies from the pressure side of the trailing edge region, through the leading edge, and to the suction side of the trailing edge region;

a filler element in the trailing edge region aft of the internal cavity and sandwiched between the skin fiber plies on the pressure side and the skin fiber plies on the suction side; and at least one cooling passage including:

a first, inlet orifice section opening to the internal cavity at a location forward of the radiused end and extending through the core fiber plies, wherein there is a number N of the core fiber plies each having a ply thickness t, and the location is forward of the radiused end by a distance D that is greater than the product of N, t, and a multiplier X that is from five to ten, a second, outlet orifice section extending through the trailing edge, and a third, intermediate section connecting the first and second sections, and the third section laterally bound by at least one of the skin plies.

2. The airfoil as recited in claim 1, wherein the third section is also laterally bound by the filler element.

3. The airfoil as recited in claim 2, wherein the filler element includes a filler core and a filler skin ply on the filler core, and the filler skin ply partially bounds the third section.

4. The airfoil as recited in claim 2, wherein the third section is bound by at least two of the skin plies.

5. The airfoil as recited in claim 1, wherein the location is toward the suction side of the core fiber plies.

6. The airfoil as recited in claim 1, wherein the at least one cooling passage includes multiple cooling passages, for a first portion of the multiple cooling passages the location is toward the suction side of the core fiber plies, and for a second portion of the multiple cooling passages the location is toward the pressure side of the core fiber plies.

7. The airfoil as recited in claim 6, wherein the multiple cooling passages each include a third, intermediate section connecting the first and second sections, the third section of the first portion of the multiple cooling passages extending adjacent the suction side between at least one of the skin plies and the filler element, and the third section of the second portion of the multiple cooling passages extending adjacent the pressure side between at least one of the skin plies and the filler element.

8. The airfoil as recited in claim 1, wherein an inner surface of the at least one of the skin plies bounds the third section, the inner surface facing toward the core fiber plies.

9. The airfoil as recited in claim 8, wherein the at least one cooling passage is a single cooling passage, the first inlet orifice section is a single inlet orifice, and the second outlet orifice section is a single outlet orifice.

10. A gas turbine engine comprising:

a compressor section;

a combustor in fluid communication with the compressor section; and a turbine section in fluid communication with the combustor, the turbine section having airfoils each including:

an airfoil section defining pressure and suction sides, a leading edge, and a trailing edge region including a trailing edge, the airfoil section being formed of a ceramic matrix composite that includes fiber plies disposed in a ceramic matrix, the fiber plies including:

core fiber plies defining a radial tube that circumscribes an internal cavity, the radial tube having a radiused end in the trailing edge region, and skin fiber plies defining an exterior of the airfoil section and wrapping around the core fiber plies from the pressure side of the trailing edge region, through the leading edge, and to the suction side of the trailing edge region;

a filler element in the trailing edge region aft of the internal cavity and sandwiched between the skin fiber plies on the pressure side and the skin fiber plies on the suction side; and at least one cooling passage including:

a first, inlet orifice section opening to the internal cavity at a location forward of the radiused end and extending through the core fiber plies, wherein there is a number N of the core fiber plies each having a ply thickness t, and the location is forward of the radiused end by a distance D that is greater than the product of N, t, and a multiplier X that is from five to ten, a second, outlet orifice section extending through the trailing edge, and a third, intermediate section connecting the first and second sections, and the third section laterally bound by at least two of the skin plies.

11. The gas turbine engine as recited in claim 10, wherein the location is toward the suction side of the core fiber plies.

12. The gas turbine engine as recited in claim 10, wherein the at least one cooling passage includes multiple cooling passages, for a first portion of the multiple cooling passages the location is toward the suction side of the core fiber plies, and for a second portion of the multiple cooling passages the location is toward the pressure side of the core fiber plies.

13. The gas turbine engine as recited in claim 12, wherein the multiple cooling passages each include a third, intermediate section connecting the first and second sections, the third section of the first portion of the multiple cooling passages extending adjacent the suction side between at least one of the skin plies and the filler element, and the third section of the second portion of the multiple cooling passages extending adjacent the pressure side between at least one of the skin plies and the filler element.

14. A method of fabricating an airfoil that has an airfoil section defining pressure and suction sides, a leading edge, and a trailing edge region including a trailing edge, the method comprising:

forming a fiber preform by:

laying-up core fiber plies to form a radial tube that circumscribes an internal cavity, the radial tube having a radiused end in the trailing edge region;

laying-up skin fiber plies to wrap around the core fiber plies to form an exterior of the airfoil section, the skin fiber plies wrap from the pressure side of the trailing edge region, through the leading edge, and to the suction side of the trailing edge region;

arranging a filler element in the trailing edge region aft of the internal cavity and sandwiched between the skin fiber plies on the pressure side and the skin fiber plies on the suction side;

at least one cooling passage being formed in the airfoil section by a first, inlet orifice section that extends through the core fiber plies and that opens to the internal cavity at a location forward of the radiused end, wherein there is a number N of the core fiber plies each having a ply thickness t, and the location is forward of the radiused end by a distance D that is greater than the product of N, t, and a multiplier X that is from five to ten, a second, outlet orifice section that extends through the trailing edge, and a third, intermediate section connecting the first and second sections, the third section laterally bound by at least one of the skin plies; and densifying the fiber preform with a ceramic matrix to form a ceramic matrix composite.

15. The method as recited in claim 14, wherein, prior to the densifying, the core fiber plies and the skin fiber plies contain no ceramic matrix.

* * * * *